(No Model.) 2 Sheets—Sheet 2.
H. CROMER.
ROTARY HARROW.
No. 518,520. Patented Apr. 17, 1894.
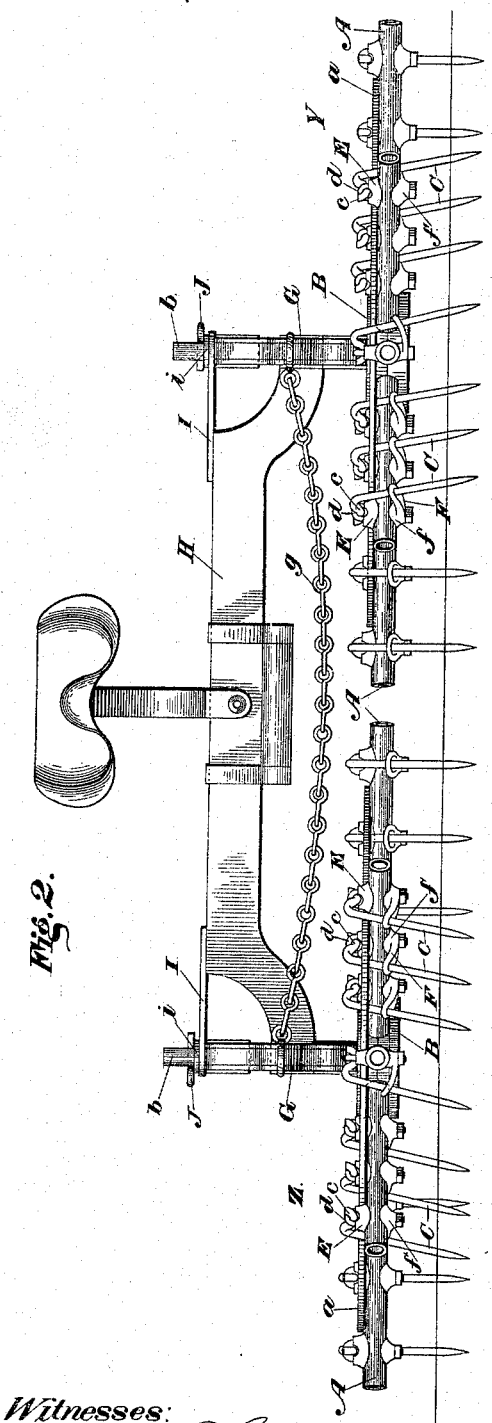
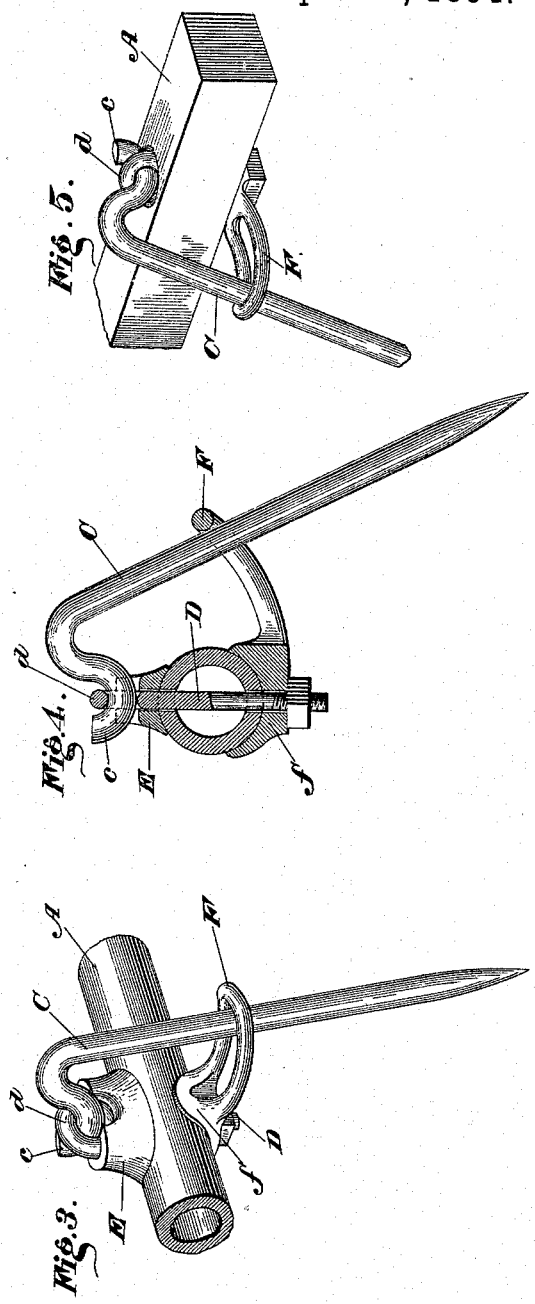
Witnesses:
M. E. Fowler
J. Mansfield
Inventor:
Hiram Cromer
By his Attorneys
Alexander & Dowell

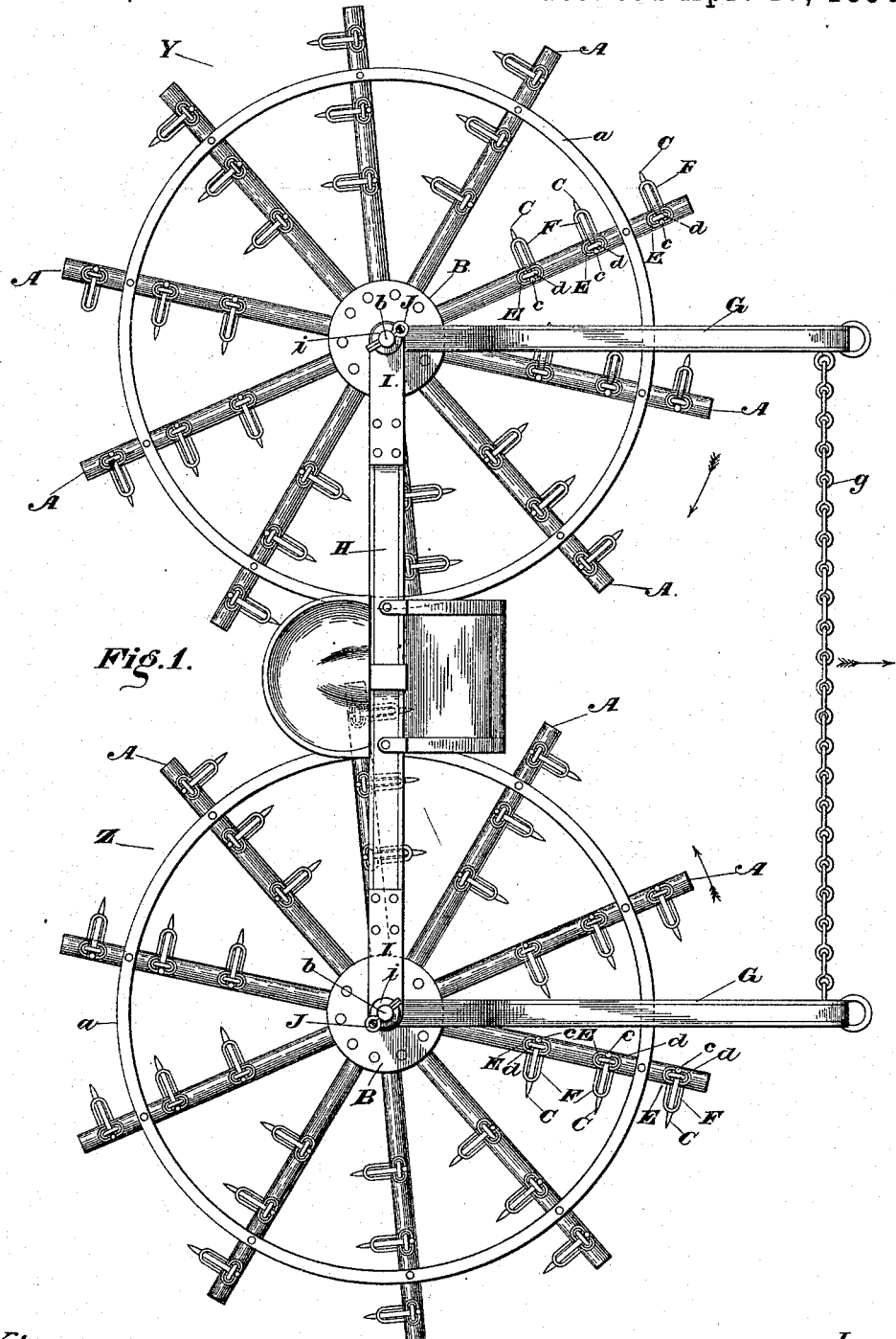

UNITED STATES PATENT OFFICE.

HIRAM CROMER, OF MUSCATINE, IOWA.

ROTARY HARROW.

SPECIFICATION forming part of Letters Patent No. 518,520, dated April 17, 1894.

Application filed April 5, 1893. Renewed March 19, 1894. Serial No. 504,278. (No model.)

*To all whom it may concern:*

Be it known that I, HIRAM CROMER, of Muscatine, in the county of Muscatine and State of Iowa, have invented certain new and useful Improvements in Rotary Harrows; and I do hereby declare that the following is a full, clear, and exact description thereof, reference being had to the accompanying drawings, and to the letters of reference marked thereon, which form part of this specification.

The present invention is an improvement in rotary harrows and its object is to so construct them that they will be caused to revolve while being drawn forward owing to the peculiar construction and attachment of the harrow teeth to the frames.

The invention consists in the novel construction of the harrow teeth, and their mountings on the frames; and in other novel details of construction and combinations of parts as will hereinafter be described and claimed.

In the drawings:—Figure 1 represents a top plan view of the harrow, the frames being so set that they will revolve toward each other as indicated by the arrows when the machine is drawn forward. Fig. 2 is a front elevation of the machine. Fig. 3 is an enlarged perspective view of one of the harrow teeth and its mountings. Fig. 4 is a vertical sectional view through the same. Fig. 5 is a perspective view indicating the means of attaching the teeth to a wooden or angular bar.

Referring to the drawings by letters:—Y and Z indicate two similar harrow frames, each constructed of a series of radially and horizontally disposed tooth-bars A, A, preferably formed of tubing, and secured at their inner ends, to a central hub B, of any suitable construction, preferably formed in two horizontally divided parts between which the ends of bars A are clamped, like the spokes of a wheel. The outer ends of bar A are connected and braced by hoops a, as shown.

To each bar A, is secured, at regular intervals, a series of harrow teeth C, these are preferably round in cross section, pointed at their lower ends and their main portions are straight, their upper ends however are bent over and up something like a letter "S" laid on edge, so as to form upwardly opening hooks c, which overlie the top of the bar, while their main portions depend beside and below the same. The hooks c, are loosely confined in eyes d, on the upper ends of bolts D which are secured in vertical openings in the bar, and are prevented from turning by saddle-castings E which are recessed in their tops to partly receive the eyes, and are concaved on their bottoms to fit on the round bars, so that when the nuts on the bolts are screwed up, the saddles not only prevent the bolts turning but re-inforce the eye bolts so that they can withstand severe strain and usage. The straight portion of the tooth depends through a loop-casting F which projects laterally from the under side of the bar, and at right angles thereto, and is, slightly upturned as shown. The slot in the loop is slightly wider than the tooth, and about four times as long as its tooth is wide, so that the tooth can oscillate slightly in a direction lengthwise of the bar, and can swing transversely of the bar to a considerable extent; the teeth are thus permitted to vibrate or move in almost any direction to a limited extent, and can therefore readily accommodate themselves to the surface over which the harrow is drawn, and yet the loop prevents their disengagement from their confining eyes. The loop casting has an enlarged head f whose upper face is concaved to fit the bottom of the bar, and is centrally perforated for the passage of bolt D, so that said bolt and its nut secure the tooth, saddle, and loop, to the bar. From the hubs B rise vertical stub-shafts b, which are journaled in the bifurcated ends of horizontally disposed draft-bar G, G, the outer ends of which are connected by a chain g so that they cannot swing too far apart. The stub shafts are also connected by and journaled in the ends of a horizontal beam H, by which the frames are kept a proper distance apart. The ends of beam H are connected to the shafts b, intermediate the bifurcations of bars G. The upper ends of shafts b, extend through plates I attached to the extremities of beam H, above which are placed washers i, all being confined on the shaft by keys J. By this means the harrow frames are securely connected, yet can be conveniently transposed or detached. Or by disconnecting one end of chain g to draft-bars can be swung around so as to draw the frames in the contrary direction. Upon the beam a driver's seat and foot rest can be mounted. The teeth it will be observed are all secured to the bars in a similar manner, so that the teeth on diametrically opposite bars stand at opposite sides of a diametrical line therethrough; this fact, and the peculiar mounting of the wheels causes the rotation of the frames as the machine is drawn forward, for when the teeth stand vertical and against the side of bar or inner end of loop, they drag more heavily than when they are inclined and at the outer end of loop.

Looking toward beam G as shown in Fig. 1 it will be seen that the teeth on the bars below the beam and in line therewith are on the front side of the bars, while the teeth on the bars in line with the beam, but beyond the ends thereof are at the back side of the bars, consequently the greatest resistance of the frames will be at the inner sides thereof, and they will rotate inwardly, so that the trash and débris will be thrown toward the center of the machine and between the frames. If now the machine is drawn in the contrary direction the greatest resistance will be on the outer side of the frames, and they will rotate in the contrary direction, throwing the débris to the sides of the machine and away from the center. The peculiar loose mounting of the teeth permits and insures this rotary motion of the frames, and consequently there is no trailing of the teeth, and the ground over which the machine is drawn is thoroughly harrowed. The machine can be transported as a whole, or the frames can be readily detached for transportation. The peculiar mountings of the teeth whereby their limited universal or gyratory motion is permitted prevents their accumulating or choking with débris, and renders them self-cleaning. When the frames have square or angular tooth bars as indicated in Fig. 5 the saddle can be dispensed with, and the loop modified to best suit the form of bar, the shape of tooth however being substantially unchanged, and its free movement being provided for as above described.

The harrow teeth and fastenings are applicable to other forms of harrows, and I do not confine myself to its use only in the rotary harrow herein described. Of course one frame only may be employed, but two should be used as their tendency to move laterally is then mutually counteracted.

Having described my invention, what I claim as new, and desire to secure by Letters Patent thereon, is—

1. The herein described harrow tooth having a straight body, and its upper end bent like a horizontally disposed letter S, substantially as described.

2. The combination with a tooth bar, and a tooth loosely secured to the top thereof and depending below it at one side thereof; with a loop attached to said bar and projecting laterally therefrom, so that the tooth can swing at right angles to the bar substantially as and for the purpose specified.

3. In a harrow the combination of a tooth bar, a harrow tooth having its upper end bent over and loosely secured to the top of the bar and depending beside and below the same; with the loop attached to the bar and projecting laterally therefrom at right angles thereto, through which the vertical part of the tooth loosely passes, substantially as and for the purpose set forth.

4. In a harrow the combination of the tooth bar, the eye-bolt passing therethrough, the harrow tooth having its upper end loosely engaging the eye of the bolt, and a loop casting secured to the bottom of the bar by said bolt, and projecting laterally therefrom, through which the tooth passes, substantially as and for the purpose described.

5. In a harrow the combination of the tooth bar, the eye-bolt passing therethrough, the saddle interposed between the eye and bar, the loop casting secured to the bottom of bar and projecting laterally therefrom, all constructed and arranged to operate substantially as and for the purpose set forth.

6. In a rotary harrow the combination with the harrow frame composed of a series of radial bars connected to a central hub, with the series of teeth loosely secured to the upper side of each bar and depending beside the same, and the loops attached to the lower side of bar and projecting laterally therefrom at one side thereof through which the teeth pass, whereby the teeth are permitted a limited movement longitudinally of the bar, and a swinging movement transversely thereof, substantially as and for the purpose set forth.

7. The combination of a pair of harrow frames each composed of a series of radial bars connected to a central hub, and a beam connecting said hubs to hold the frames in proper relative position; with the series of harrow teeth loosely connected to each bar depending below the same at one side thereof and capable of a limited gyratory movement the teeth on the adjoining bars of the harrow frames being secured to the same, front or rear, sides of such bars, whereby the harrows are caused to rotate in opposite directions when drawn forward, substantially as and for the purpose specified.

In testimony that I claim the foregoing as my own I affix my signature in presence of two witnesses.

HIRAM CROMER.

Witnesses:
T. R. FITZGERALD,
S. C. DUNN.